Aug. 14, 1951 L. L. WALKER 2,564,138
MACHINE VISE JAW ROCKABLE DOWNWARDLY
WHEN PRESSED AGAINST WORKPIECE
Filed March 7, 1949 3 Sheets-Sheet 1
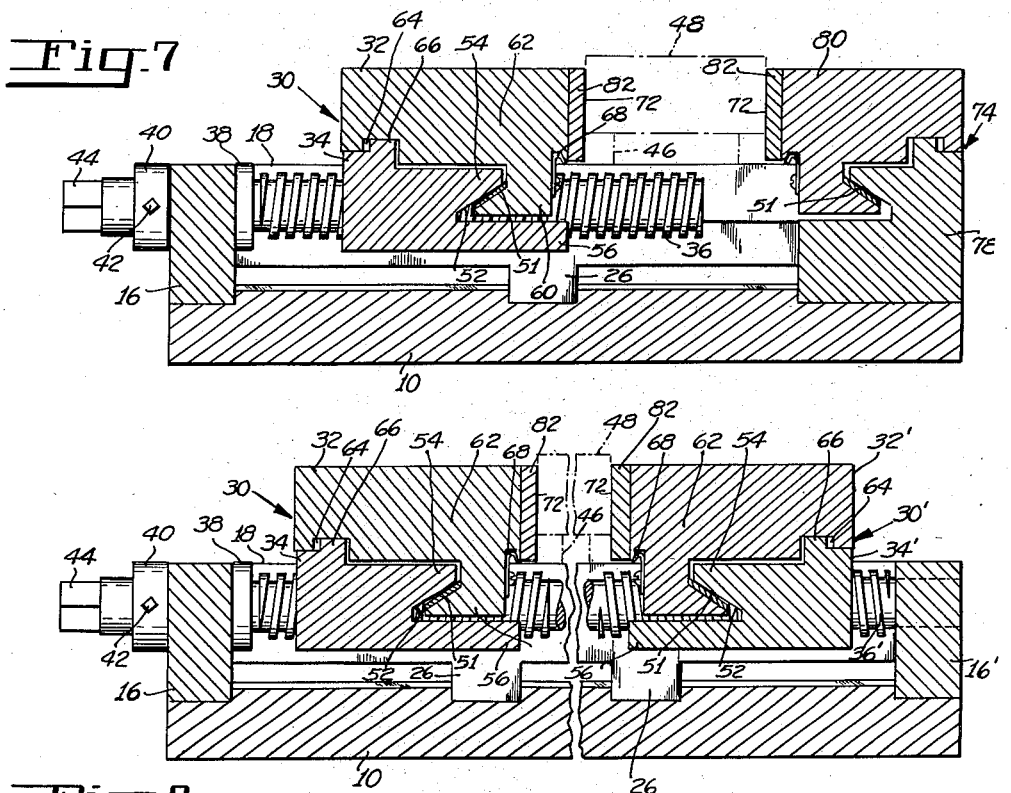
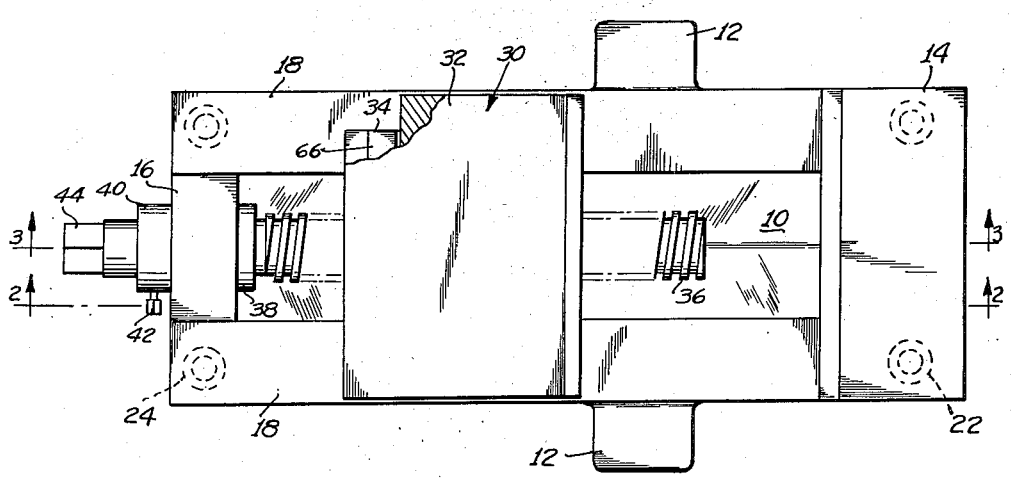
INVENTOR.
LOCKO L. WALKER
BY
ATTORNEYS INVENTOR.
LOCKO L. WALKER
BY
Reynolds + Beach
ATTORNEYS Aug. 14, 1951            L. L. WALKER            2,564,138
MACHINE VISE JAW ROCKABLE DOWNWARDLY
WHEN PRESSED AGAINST WORKPIECE
Filed March 7, 1949            3 Sheets-Sheet 3

INVENTOR.
LOCKO L. WALKER
BY
           Reynolds & Beach
ATTORNEYS

Patented Aug. 14, 1951

2,564,138

UNITED STATES PATENT OFFICE 2,564,138

MACHINE VISE JAW ROCKABLE DOWN-WARDLY WHEN PRESSED AGAINST WORKPIECE

Locko L. Walker, Seattle, Wash.

Application March 7, 1949, Serial No. 80,033

4 Claims. (Cl. 90—61)

This invention relates to improvements in machinists' vises or the like, and is focussed on the problem of holding the work more securely and locating it more accurately in the vise.

In a conventional type of vise there is a tendency, especially as a manifestation of wear, for the movable jaw to rise and tilt backward in reaction to increasing pressure, thereby tending to deprive the jaws of their ability to maintain a secure grip on the work, and to render the location of the work in the vise uncertain and unpredictable. In the case of a vise or workholder for a milling machine, shaper, planer, grinder, or the like, it is frequently desirable to remove and replace a piece of work several times during the course of machining operations. However, because of the aforementioned difficulty with vises or workholders heretofore available the machinist could not always be certain that the work would be relocated in the same position in the vise with relation to the tool as it was previously.

Others in attempting to solve this problem in the past have proposed vises of two general types, both of which involved an articulated movable jaw formed in two parts, one a part, which is herein referred to as the "jaw nut," usually threaded on a lead screw, and the other a work-engageable part herein termed the "jaw bit" carried by and loosely connected to the jaw nut.

In the first of these two types, an increase in jaw pressure caused the work clamped between the jaws to be pressed downward against the bed of the vise. Such a result was attained by cam or wedging action, for example, taking place between the two jaw parts and effecting descent of the jaw bit relative to the jaw nut upon increasing jaw pressure. While this action of the jaw bit tended to compensate for the lifting reaction of the jaw nut to increasing pressure it did not overcome the effects of the latter's tilting. To enable such descent of the jaw bit, it was normally held by spring means, slightly raised on the nut, with the vise relaxed.

In the second type of vise mentioned the jaw bit did not descend in reaction to increasing jaw pressure, but merely remained at all times in contact with runner strips or guides. As a result, the work was not in this case noticeably urged downward against the vise bed in response to jaw pressure. Instead the intended beneficial result of the cam or wedging action occurring between the jaw parts was to maintain the bit pressed firmly against the guides and therefore at constant level despite rising or backward tilting of the jaw nut.

I have discovered that greatly improved results are obtainable for the purposes mentioned, by incorporating in a vise of the articulated movable jaw type means cooperating between the jaw parts and operable responsively to jaw pressure not only to press the work affirmatively against the vise bed or a parallel strip thereon, but additionally, either to prevent the jaw bit tilting backward, or to tilt it actually forward relative to the opposing jaw.

Other objects of the invention include providing a vise construction which is rugged, durable, and can be manufactured cheaply; a vise which is readily actuated and has negligible tendency to bind despite application of high pressure to the work; one having provision for automatically clearing from the jaw guides and vise bed, chips and filings dropping thereon; providing a vise the accurate operation of which is negligibly affected by wear.

In achieving the objects mentioned, an important feature of the invention resides in an articulated jaw comprising a base member, such as a nut traversing a lead screw in the vise, a jaw bit carried by and loosely connected in a special manner to the nut, and cam means or the like, operable upon increasing jaw pressure to rock the bit on the nut, both downward and forward relative to the work. By rocking downward as pressure is increased the jaw bit affirmatively presses the work downward against its support. By tilting forward as it rocks, such bit overcomes any tendency it may have to be tilted backward as a result of reactive backward tilting of the jaw nut upon increasing pressure. A rocking-bit jaw type vise, such as that herein described, is particularly advantageous in that consistently accurate location of the work therein is attainable. Moreover, there being no large relatively slidable surfaces coming into contact between the jaw bit and nut, binding between these parts is minimized, so that they are readily actuated.

Preferably the articulated movable jaw assembly includes resilient means, such as a spring, reacting upwardly against the jaw bit from another part of the vise, such as the guides, to maintain such bit normally rocked into an upper position on the nut when the vise is relaxed. When pressure is exerted by the jaw this spring yields to reactive downward thrust of the bit resulting from the cam action between jaw bit and nut. In the illustrated case this spring is formed as a strip having opposite arms in sliding contact with the top faces of the jaw guides to act as swipes or scrapers removing chips and filings therefrom during movement of the jaw.

These and other objects, features, and advantages of the invention can be more readily appreciated from an understanding of the following description based upon the accompanying drawings illustrating the invention in preferred forms.

Figure 1 is a plan view of one form of my improved vise with a corner of the articulated movable jaw broken away to show a detail.

Figures 7 and 8 (Sheet 1) illustrate two different modified forms of the improved vise, and correspond in view location to Figure 2.

Figure 2:
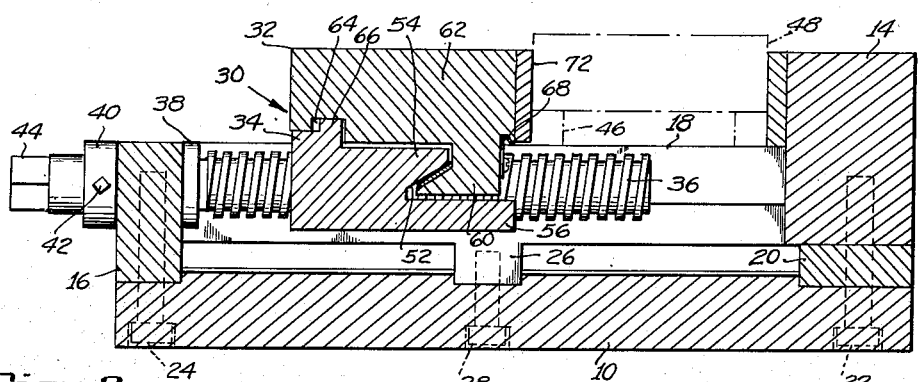
Figure 2 is a vertical sectional view taken longitudinally of the vise on line 2—2 of Figure 1.
Figure 3:
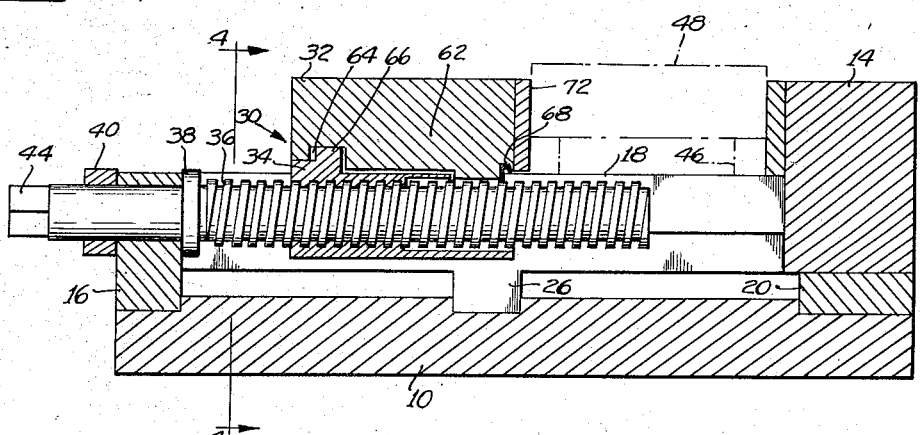
Figure 3 is a vertical sectional view taken longitudinally of the vise on line 3—3 of Figure 1.
Figure 4:
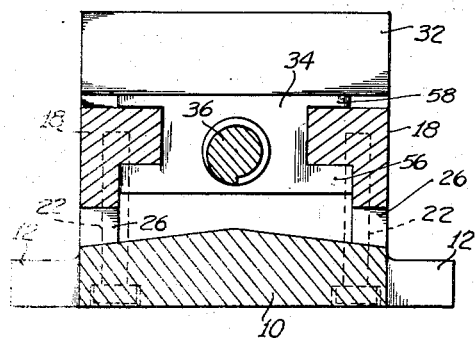
Figure 4 is a vertical sectional view taken transversely of the vise on line 4—4 of Figure 3.

Referring first to the form shown in Figures 1 to 6, inclusive, the vise comprises a base 10 from opposite sides of which project mounting lugs 12 by which the vise may be clamped on the table of a machine or on a work bench. The top face of the elongated base is preferably bevelled oppositely from its longitudinal center line to its side edges, as shown in Figure 4, so that chips and filings dropping thereon will tend to roll or slide off, especially under vibration of a machine in which the vise may be mounted.

A stationary jaw 14 is mounted on one end of base 10. At its opposite end the base carries a journal block 16. Extending between this block and the stationary jaw, a pair of guides 18 are mounted in spaced parallel relation overlying the opposite side edges of the base 10, respectively. These guides are generally L-shaped in cross-section, with one flange thereof directed inward and the other flange downward, as shown in Figure 4.

The opposite sides of both the journal block 16 and the stationary jaw 14 are milled out or notched in order to receive the respective ends of guides 18, which extend the full length of the base 10. With a spacer bar 20 interposed between the bottom of the stationary jaw 14 and base 10, this jaw and the ends of the respective guides 18 received in its sidewardly opening notches are anchored together firmly to the base of the vise by machine screws 22 which thread into the ends of the respective guides through the stationary jaw from the bottom of the base. Similarly, machine screws 24 anchor the opposite ends of these guides and the notched journal block 16 to the base 10, as shown in Figure 2. The guides are further supported and anchored to the base 10 at locations intermediate to their ends by leg portions 26 secured to the base by machine screws 28 threaded up into them.

The vise has a movable jaw 30 which comprises a jaw bit 32 and a carriage or jaw nut 34. The term "jaw nut" embraces any jaw element which could function as the actuated base or carriage element of the jaw. The "jaw bit" is carried by the nut and either engages the work directly itself or carries a face member which does so. As shown best in Figure 4, jaw nut 34 is preferably slidably supported between the two guides 18 for longitudinal travel in the vise, and is actuated for such movement by a lead screw 36 threaded through the jaw nut and extending longitudinally from journal block 16, in which it is rotatably mounted, a greater part of the distance to the oppositely located stationary jaw 14 to provide maximum range of travel for the movable jaw 30.

The lead screw 36 has an upset portion or flange 38 bearing against the inner face of journal block 16, which carries the thrust load of the screw resulting from clamping pressure which it exerts through the jaw 30 on the work. A removable collar 40 is secured by set screw 42 on the unthreaded end of the lead screw projecting through the journal block, adjacent to the outer face of the block to prevent axial shifting of the lead screw towards stationary jaw 14. At its very end the lead screw is made square in cross-section to provide a head 44 engageable by a wrench or crank arm to rotate the screw.

When work is placed in the vise between jaws 14 and 30 it may rest directly upon the upper faces of the guides 18 as the vise bed. Alternatively, it is customary, especially with thin work, to lay a parallel strip 46 over and across the guides 18 between the vise jaws and to rest the work 48 (Figure 3) on this parallel strip for clamping between the jaws. A machinist will have available an assortment of these parallel strips varying in thickness so that a piece of work placed in the vise may be spaced upward from its bed just far enough to enable it to be machined without interference from the vise jaws.

The construction and arrangement in the vise of the articulated movable jaw parts 32 and 34 lie at the foundation of the invention. While the particular form of these parts may be varied considerably within the principles involved, that herein illustrated is the form of jaw which I presently prefer. The jaw bit 32 and jaw nut 34 receive their relative cam action by longitudinal sliding engagement of opposing transverse surfaces 50 and 52. These surfaces are inclined in the same direction at acute angles which are approximately equal, such as in the vicinity of 30°, from the horizontal. The incline of these surfaces is such that by wedging action as the jaw bit 32 presses against the work the jaw bit will be forced downward.

Figure 5:
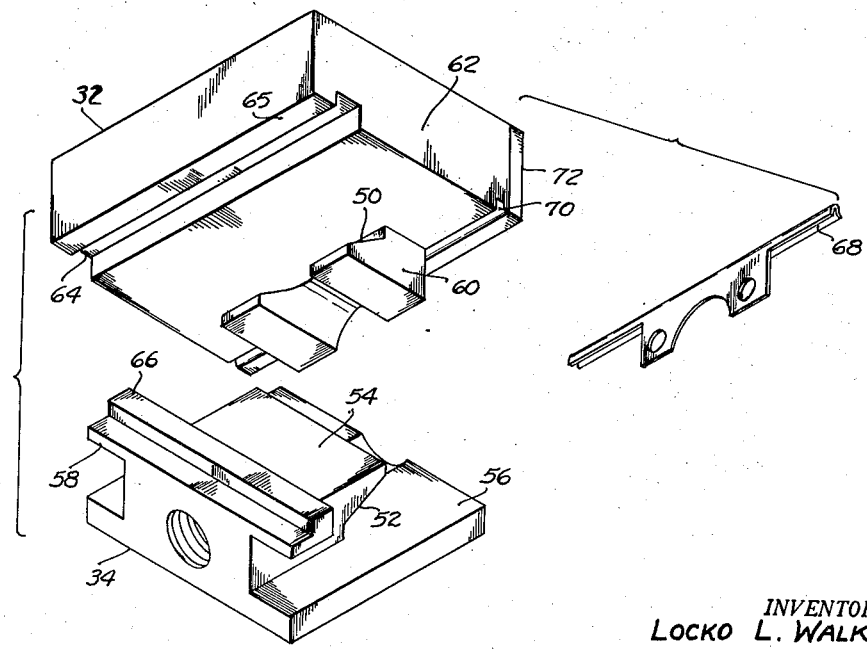
Figure 5 is an exploded isometric view of the articulated movable jaw.

Cam surface 52 on jaw nut 34 is formed by kerfing the forward lower end of an upwardly projecting central block portion 54 of the jaw nut. Such block portion projects upward from the nut base 56 and is received between the tracks 18. The opposite sides of the nut base 56 project laterally into the right-angle inside corners formed by the two flange portions or legs of the respective guides, as shown in Figure 4. As seen in Figure 5, block portion 52 is bored and threaded longitudinally for internal engagement thereof by the lead screw 36. Extending transversely across the top of this block portion at its end farthest removed from stationary jaw 14, is a guide retainer bar 58 whose opposite ends project laterally of the jaw nut into overlapping sliding contact with the upper faces of the respective tracks 18. Thus jaw nut 34 is slidably retained between guides 18 by base 56 and bar 58.

Figure 6:
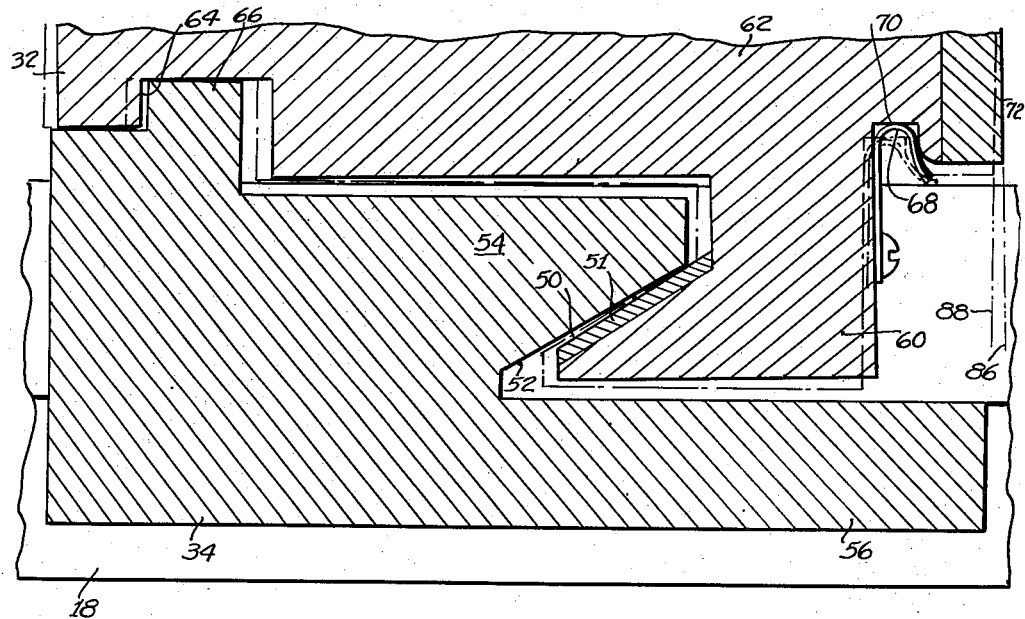
Figure 6 is a greatly enlarged fragmentary sectional view corresponding to Figure 2, showing the bit member in different operating positions on the nut member.

Cam surface 50 on jaw bit 32 is similarly undercut or provided with a kerf in the rearward upper end portion of block 60 projecting downward from the bottom face of the general body portion 62 of the jaw bit, and forward to hook under the kerfed block 54 of the jaw nut. When the tapered tips of these two complementally configured block portions 54 and 60 are brought into overlapping registry with their inclined cam surfaces 50 and 52 contacting, as shown in Figure 6, the general bottom face of the jaw bit body portion 62 will directly overlie the top face of block 54 on the jaw nut. The bottom face of the depending block portion 60 is grooved longitudinally to accommodate and yet clear the threads of the lead screw 36, as shown in Figure 3, so that the jaw bit is actuated only by the jaw nut and not independently by the lead screw.

A transverse groove 64 extending the full width of the jaw bit body portion 62 is formed in the latter's lower face near its rearward edge, leaving a narrow marginal strip or rib 65 between such rear edge and the groove. This strip is preferably disposed a short step higher in relation to the underlying nut than is the general bottom face of body portion 62. In this groove is received, when the jaw parts are brought together, a complemental, although somewhat more narrow, upstanding, transverse tongue or rib 66 extending lengthwise along the guide retainer bar 58 on the jaw nut. Normally the top of tongue 66 contacts the bottom of groove 64 to hold the body of the jaw bit out of general surface contact with the jaw nut.

Such interface clearance between these two jaw parts, as appears most clearly in Figure 6, enables relative longitudinal sliding movement between them with negligible binding, since their principal points of contact are then the tongue-and-grooved end portions, respectively, of nut and bit, and their contacting cam surfaces 50 and 52. Furthermore the nut and bit jaw members are so formed that their respective cam faces 50 and 52 contact each other along a line, and never quite reach flat surface to surface contact even when the bit is rocked into its extreme positions, so that binding is further minimized.

A spring strip 68 having oppositely extending arms is secured by its mid-portion to the forward side of block 60 of the jaw bit, and partly received in a transverse groove 70 formed in the bottom forward-end face of the jaw bit. The laterally projecting arms of this spring overlap and slide directly on the faces of respective guides 18 from which they react upwardly on the bit to lift its forward end up off the guide surfaces, as shown by solid lines in Figure 6.

This is the normal, upwardly rocked position of the jaw bit relative to the jaw nut with the vise relaxed. The upper end of cam surface 50 is then contacted along a narrow transverse area or line by the upper or tip end of cam surface 52, with the surfaces relatively slightly inclined so as to form a downwardly opening small dihedral angle between them. At the same time, in this position of the jaw bit the lifting effect of spring 68 acting on it, resisted by contact of the slidably engaged cam surfaces, causes the jaw bit to slide slightly forward on the nut as the bit rises under spring force. At this time the jaw bit face 72 lies in a plane represented by broken line 86 (Figure 6), preferably tilted slightly back from the vertical, away from the stationary jaw.

When the vise is initially closed on the work by advancing the jaw bit and nut until the former contacts the work, the upwardly rocked, forwardly displaced jaw bit is stopped while the jaw nut 34 tends to continue its advance, actuated by turning of lead screw 36, to increase the jaw pressure. As greater force is transmitted from the nut to the jaw bit through the medium of contacting of cam surfaces 50 and 52, relative longitudinal sliding thereof takes place, wedging the jaw bit downward as the jaw nut continues to advance. As it descends, the bit rocks downward and forward about its fulcrum at the slidably contacting rearward ends of the jaw nut and bit, as the bit slides back slightly on the nut.

As a result, the work-engaging face 72 of the jaw bit is caused to swing downward as jaw pressure on the work increases. This forces the work downward affirmatively against the underlying parallel strip 46. At the same time the jaw face 72 tilts progressively forward, such as into a vertical plane represented by broken line 88 (Figure 6) by the time full pressure is attained. It is important to note that such tilting occurs relative to the jaw nut and may be made sufficient to compensate fully for any upward and backward tilting of the jaw nut occasioned as a result of any slack or looseness between the same and its guides, in reaction to increasing jaw pressure. The bit may actually tilt forward.

In an extreme case the limiting downward position of the jaw bit would be that in which it directly contacts the guides 38. This would be the situation where no spring 68 is employed to raise the bit normally on the nut. However, as shown in Figure 6, where a spring is used, the bit may never reach that position because of the resistance to downward movement as a result of friction between the bit face and the work as jaw pressure is increased. In normal operation of the vise the downward displacement of the bit as pressure is applied becomes more or less indeterminate, depending upon the nature of the work contacted and the amount of pressure applied thereto. The broken-line position of the jaw bit, shown in Figure 6, illustrates the jaw bit in one clamping position. Attention is directed to the fact that the cam surface 50 has still not quite reached parallelism with cam surface 52, so that their area of contact is still small and friction slight. In this connection, it will be evident that other fulcrum arrangements alternative to the tongue and groove sliding surfaces may be employed, such as a slot and pin or the like. Likewise, the cam or wedging action by which the block is rocked is achievable by means other than by two opposing inclined cam surfaces.

When pressure is again removed from the vise by counter-rotation of lead screw 36, withdrawing the articulated movable jaw 30 away from the work, the jaw bit, urged upward by spring 68, moves from its downwardly rocked broken-line position into its upwardly rocked full-line position, as shown in Figure 6. This spring, sliding on guides 18, has the additional purpose of scraping the chips and filings off the guide surfaces during closing of the vise, so that these chips cannot get into the spaces between the guides and the slidable jaw nut to produce wear and friction.

Figure 7 illustrates a modification of the vise already described in that the stationary jaw 74 of the modified form is likewise of articulated construction having a base portion 78 and jaw bit portion 80. These respective portions are similar to the jaw nut 34 and jaw bit 32 of the articulated movable jaw except that they lack any provision for a lead screw. The same slight longitudinal displacement and downward rocking action takes place in jaw bit 80 of the stationary jaw as it does in the corresponding part of the movable jaw, so that in a vise having both of its jaws of the illustrated articulated form the work clamped between the jaws is pressed affirmatively downward at both of its opposite faces, instead of only at one face as in the previously described form. In some applications this type of vise with both jaws of articulated construction will be sufficiently advantageous to justify the added cost of the more complex stationary jaw.

The further modified form of the vise, appearing in Figure 8, has no stationary jaw but two oppositely movable jaws 30 and 30' of identical articulated construction, similar to that previously described, such jaws being actuated by reversely threaded portions of lead screws 36' so that they move simultaneously in opposite directions as the screw is rotated in one direction or the other. In Figure 8, various parts are identified by primed numerals similar to those corresponding parts designated in Figures 1 to 6. In this case, the end of the vise opposite from journal block 16 carries a second journal block 16' to provide a rotative support for the end of the lead screw opposite its tool-engageable end 44.

If desired in any of the forms described, one of the cam surfaces, such as surface 50, may be covered by a bearing strip 51 of a metal such as brass which provides a good bearing contact with steel, of which the other vise parts may be manufactured. Such a bearing strip may be replaced after it has become worn. This and other details, such as hardened jaw face strips 82, are more or less obvious or subject to variation and require no further elaboration.

Referring back to the first-described form shown in Figures 1 to 6, it will be obvious that the vise is readily assembled as follows: With the lead screw 36 and its journal block 16 removed from the vise base, the jaw bit and nut are first independently brought into interlocking position with their kerfed cam blocks overlappingly engaged, by lateral relative sliding movement parallel to their respective tongue and groove members. When they react in lateral registry, the screw is threaded part of its length through the nut. This holds the nut and bit together so that they cannot separate even by relative lateral motion, the grooved block 60 on the bit embracing the screw to act as a keeper. The resulting assembly is then moved into position of registry of the nut with guides 18, whereupon the nut is slid along the guides toward stationary jaw 14 until journal block 16 arrives at mounting position on the end of base 10, interengaged with the guide ends. With the journal block bolted in place the vise is ready for immediate use.

It will be noted that surfaces 50 and 51, and also the sliding surfaces of the parts 64 and 66 are effectively shielded against infiltration of metal chips and the like when the vise is assembled, which might interfere with operation and produce wear of the parts.

I claim as my invention:

1. A vise or the like comprising an underlying base, a first jaw carried by said base, an articulated second jaw comprising a jaw carriage member, longitudinal jaw guide means on said base guiding, and cooperating means actuating, said carriage member for forward and rearward movement of said second jaw, toward and from said first jaw, respectively, to grip and release work therebetween, said guide means including generally coplanar workbed surfaces extending between the jaws, said articulated second jaw further comprising a jaw bit member carried slidably on and generally overlying, said carriage member, said bit and carriage members including cooperating overlapping wedge-shaped projections thereon formed generally for hooking of the bit projection rearward and under the carriage projection, said projections having slidably engaged transverse cam surfaces inclined to the workbed plane in a direction to force the bit toward the bed plane by rearward sliding of such bit relative to said carriage member in reaction to increasing jaw pressure in the work, spring means urging said jaw bit member away from said bed plane into an initial position of the jaw bit tilted rearward away from the first jaw and said bed plane, and means on said bit and carriage members guiding said bit member for tilting forward toward the first jaw and bed plane as such member is forced toward such bed plane by camming action of said cam surfaces during tightening of the vise.

2. The vise defined in claim 1, wherein the latter guiding means comprise slidably engaged generally flat bit-guiding surface portions on the bit and carriage members, extending generally parallel to the bed plane and each having a transverse step therein extending generally perpendicularly to such plane, the steps comprising co-acting stops limiting forward sliding movement of the jaw bit relative to the carriage member and thereby preventing unhooking of the bit and carriage projections by such movement.

3. The vise defined in claim 1, wherein the jaw guide means comprise transversely spaced parallel guides slidably engaged by the carriage member, and wherein the interengaging wedge-shaped projections of the bit and carriage members are received slidably between said guides.

4. The vise defined in claim 3, wherein the spring means are secured to the end of the bit member nearest the first jaw and comprise transversely extending leaf spring arms having edges resting slidably on the upper surfaces of the guides to support the jaw bit member resiliently therefrom, said edges extending generally crosswise of the guides whereby to scrape filings and chips from such guide surfaces during advance of the second jaw toward the first.

LOCKO L. WALKER.

REFERENCES CITED

The following references are of record in the file of this patent:

UNITED STATES PATENTS

| Number | Name | Date |
| --- | --- | --- |
| 593,681 | Obernesser | Nov. 16, 1897 |
| 1,206,399 | Bartlett | Nov. 28, 1916 |
| 2,373,384 | Cross et al. | Apr. 10, 1945 |

FOREIGN PATENTS

| Number | Country | Date |
| --- | --- | --- |
| 160,095 | Germany | Feb. 16, 1904 |